United States Patent
Bellastio

[11] 3,825,271
[45] July 23, 1974

[54] FLUID SEALING DEVICE FOR ELECTRIC CABLE CURING APPARATUS

[75] Inventor: Aldo Bellastio, Milan, Italy

[73] Assignee: Industrail Pirelli Societa per Azioni, Milan, Italy

[22] Filed: Jan. 10, 1973

[21] Appl. No.: 322,453

[30] Foreign Application Priority Data
Feb. 3, 1972   Italy .................................. 160/72

[52] U.S. Cl. ............................... 277/34.3, 277/152
[51] Int. Cl. ............................................. F16j 15/46
[58] Field of Search ............ 277/34.3, 34, 34.6, 152

[56] References Cited
UNITED STATES PATENTS

| | | | |
|---|---|---|---|
| 2,719,737 | 10/1955 | Fletcher ............................ | 277/34.3 |
| 2,825,589 | 3/1958 | Richardson et al. .................. | 277/34 |
| 3,226,467 | 12/1965 | Kienel et al. ....................... | 277/53 X |
| 3,337,222 | 8/1967 | Smith et al. ........................ | 277/34.3 |
| 3,471,156 | 10/1969 | Burns et al. ........................ | 277/34 X |

Primary Examiner—Samuel B. Rothberg
Attorney, Agent, or Firm—Brooks Haidt & Haffner

[57] ABSTRACT

A sealing device for controlling the water flow from between a cable sheath and the end of a sheath curing tube as the cable passes through the tube, the sealing device comprising a frusto-conical elastic sleeve having its larger inner diameter larger than the sheath diameter and its smaller inner diameter approximately equal to that of the cable sheath. Most of the exterior surface of the sleeve is covered by a rigid sleeve shaped like the elastic sleeve but having a portion spaced from the smaller diameter end of the elastic sleeve to form a chamber which receives an air expandible elastic member in the shape of a toroid to vary the diameter of the elastic sleeve opening. The rigid sleeve also covers most of the smaller diameter end of the elastic sleeve to hold the latter in place but has an opening larger than the maximum sheath diameter to be processed.

6 Claims, 2 Drawing Figures

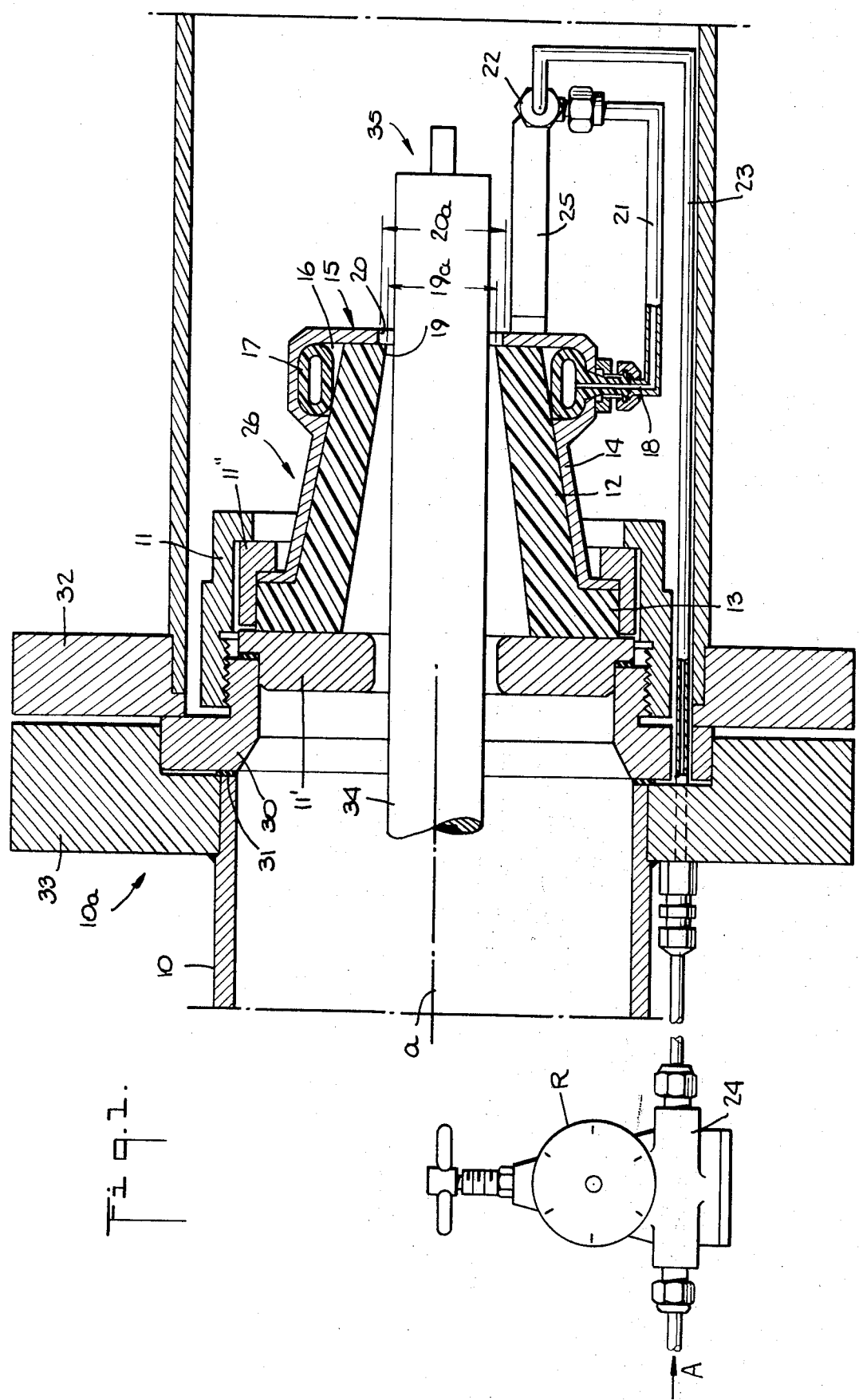

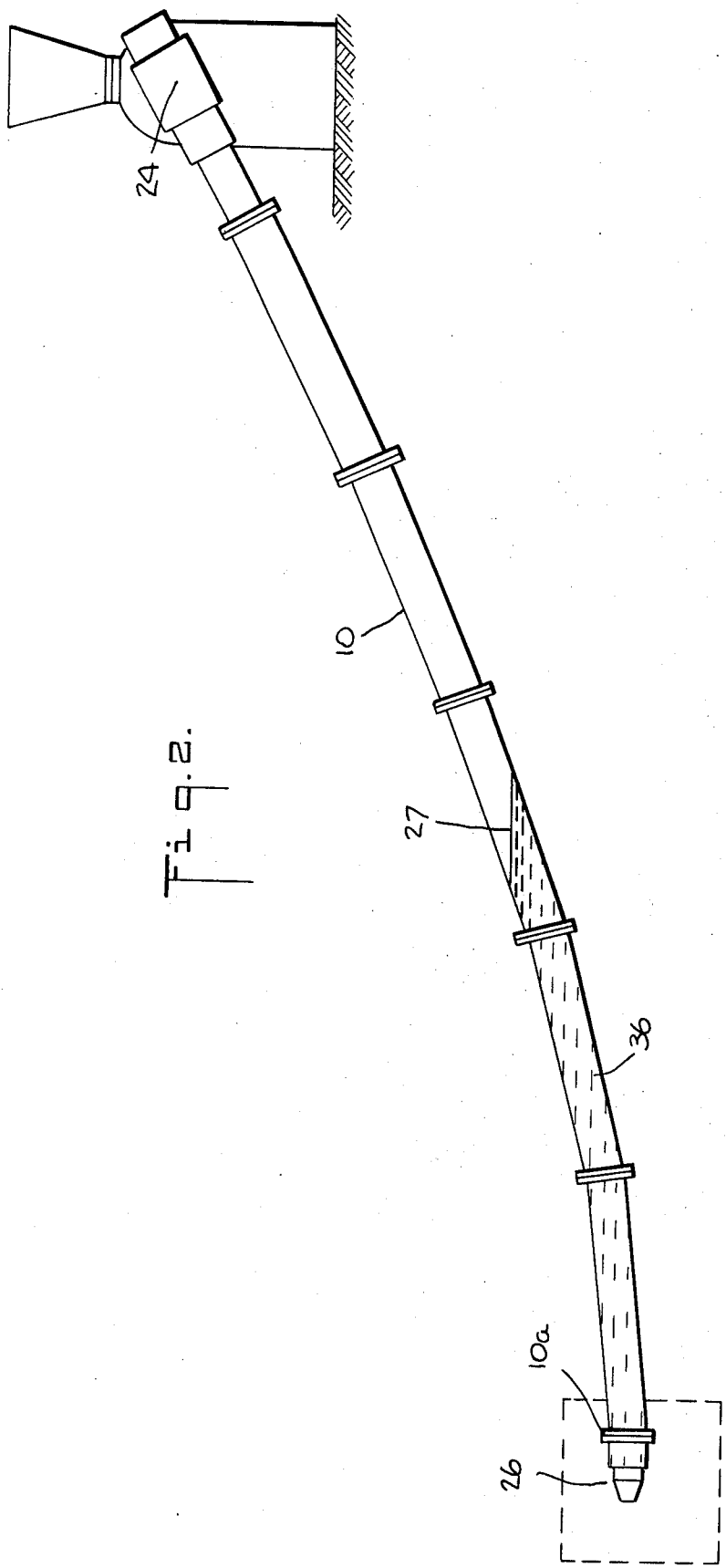

FLUID SEALING DEVICE FOR ELECTRIC CABLE CURING APPARATUS

The present invention relates to an improved fluid sealing device, especially but not exclusively intended to be applied at the outlet of the curing tube of a continuous extrusion and curing, or cross-linking, line for sheathing electric cables, preferably a continuous extrusion and curing, or cross-linking, line known in the art as a catenary-type line.

For applying sheathing to single-core or multicore electric cables in the form of rubber material, e.g., butyl rubber, or with plastic material, e.g., cross-linked polyethylene, it is known in the art to use extruders which cover with such a sheath both bare individual conductors and insulated conductors stranded together.

The conductor or conductors, so sheathed by the extrusion head, passes or pass directly into a tube inclined downward and filled in its upper portion by steam at high pressure and temperature, usually wet steam, which applies pressure to a cooling liquid of the same nature as steam, usually water, filling the lower portion of the tube.

The material forming the cable sheath is cured or cross-linked in its passage through the portion of the tube occupied by the steam, and is then cooled under pressure and set, before emerging from the tube, in its passage through the cooling liquid.

The curing tube preferably has a curved path in the shape of a catenary curve. The catenary curvature of the tube corresponds to the catenary curve which the cable itself, advancing forward at the extrusion speed, would take by its own weight, said cable resting on two supports at different levels, one corresponding to the extrusion head and the other to the outlet of the curing tube, and being subjected to a predetermined tension exerted on it by appropriate mechanical and electrical means and so adjusted that the ratio between said tension and the weight for each unit length of the cable remains constant.

The pressure inside the curing or cross-linking tube must correspond at each instant of time to a pre-established pressure and is self-regulating, i.e. remains constant.

The lower portion of the curing tube is filled with a cooling liquid at the same pressure as the steam. At the outlet of the curing tube, a certain leakage of the liquid takes place, and it flows out of the tube through the clearance between the cable and the sealing device at the outlet end of the curing tube.

The liquid is replenished through a feeding pump, whose delivery is adjusted by appropriate regulation means, so that the level of the liquid in the curing tube is maintained constant and at a pre-established position. The optimum seal tightness conditions are obtained when the leakage is sufficient to prevent an excessive increase of the temperature of the liquid itself, due to the transfer of heat from the cable which passes through it, but is not so high as to originate an excessive outflow of liquid or at the most to exceed the replenishing capacity of the pump feed. Such optimum conditions are attained when the size of the opening of the tube outlet is approximately equal to the outer diameter of the sheathed cable.

The tightness of the fit between the tube outlet and the cable sheath in devices heretofore in use on extrusion and curing lines for electric cables, was determined only by the elasticity of the material of the seal and of the cable sheath so that it was difficult to obtain optimum conditions.

The present invention has as one object the obtaining of said optimum conditions by providing a tube outlet sealing device having an outlet opening which is adjustable during the operation of the curing tube in order to adapt it to unintentional variations of the cable sheath diameter during the extrusion thereof.

It is known to those skilled in the art that, during the extrusion of a compound on a cable, dimensional variations can take place for various reasons in the finished product, not only in different cable lengths but also in the same cable. Moreover, it is difficult to obtain, at the starting of the machine, the required rated diameter. Furthermore, at the cable end, as it enters into the tube sealing device, the covering material tends to flow and is liable to suffer deformations due to an incorrect curing.

Also, a degradation of the seal can occur by wear since the outlet opening is often subjected to strong friction and to considerable thermal variations, etc.

All the above indicated disadvantages are eliminated by the present invention, which has a further object, the providing of a tube sealing device which can adapt itself to sudden and unexpected diameter increases of the covering which can take place during the sheathing process, particularly at its starting, in order to avoid, in such an event, any flow of the covering material, which would hinder the advancement of the cable and would compel the operator to stop the machine.

A further object of the present invention is that of providing an improved sealing device, especially at the outlet of curing tubes, in particular catenary curing tubes, which has a variable outlet opening which can be adjusted, during the operation of the extrusion line in accordance with the water leakage which can be readily observed.

More precisely, the object of the present invention is an improved sealing device, intended to be applied especially, but not exclusively, to the outlet opening of a curing or cross-linking tube of an extrusion line for sheathing elastic cables, in particular an extrusion line followed by continuous curing in a catenary-shaped curing tube, which sealing device comprises a frusto-conical elastic sleeve covered with a stiffening metallic sleeve, said metallic sleeve surrounding nearly the entire outer surface of the elastic sleeve, deviating from it in proximity of the smaller base of the latter. The stiffening sleeve has an enlarged portion forming an annular chamber around the elastic sleeve outlet and then turns inwardly to provide an annular abutment for the smaller base of said elastic sleeve, the inner diameter of the abutment being greater than the maximum permissible diameter for said elastic sleeve outlet. At least one tubular elastic element, comprising at least one opening for supplying or discharging a gas under pressure, is contained in said chamber.

The objects and advantages of the invention will be better understood from the following description of the presently preferred embodiment thereof, which description should be considered in conjunction with the accompanying drawings, in which:

FIG. 1 is an enlarged, side elevation view, partly in longitudinal section, of the preferred sealing device of the invention mounted on an end of a curing tube; and FIG. 2 is a diagrammatic, side elevation view of the sealing device of the invention association with a curing tube and an extruder.

FIG. 1 illustrates the improved sealing device 26 of the invention, applied to the end 10a of a curing tube 10. The sealing device 26 comprises a frusto-conical sleeve 12 of elastic material, e.g., neoprene, which is provided at its larger end with a flange 13 intended to be held between the flanges 11, 11' and 11" for clamping the sealing device 26 to the end of the curing tube 10. The flanges 11' and 11" may be held in place by means of threaded engagement between the flange 11 and the ring 30 which is held against a gasket 31 at the end of the tube 10 by means of a ring 32 secured to the end flange 33 in any conventional manner, the flange 33 being secured to the tube 10 such as by welding.

The frusto-conical elastic sleeve 12 is contained within a frusto-conical metallic stiffening sleeve 14. The metallic sleeve 14 follows for a substantial part the outer profile of the sleeve 12 but departs from it in a portion near the smaller end of the latter, which defines an outlet 19 having adjustable opening. At the portion of the sleeve 14 which is spaced from the sleeve 12, a chamber 16 is formed and the sleeve 14 then bends in a direction perpendicular to its own axis a to provide the annular abutment 15. The abutment 15 partly covers the smaller end of the elastic sleeve 12, and the internal diameter 20a of the opening 20 in the annular abutment 15 is appreciably greater than the maximum permissible diameter 19a of the adjustable outlet 19 to permit variations of the size of the outlet 19 during operation, without engagement of the wall of the opening 20 in the abutment 15 with the sheath 34 of the cable 35 passing through the outlet 19.

The annular chamber 16 contains at least one tubular elastic element 17. In the illustrated embodiment, the chamber 16 contains a toroidal elastic element 17 provided with at least one fluid stem 18 rigidly connected to one end of a first tube 21 provided at the other end with appropriate means for connection with a second tube or plurality of tubes 23. In the embodiment illustrated, such means comprises a threaded end on the tube 21, which engages with the nut 22 of the tube 23 which leads to a reduction valve R connected with a source A (not shown) for the supply of a gas, preferably air, under pressure. The pressure in the gas source A is, of course, greater than the maximum pressure of the steam which is used when the catenary curing tube is under steady operating conditions.

The frusto-conical elastic sleeve 12 can be easily replaced when it is worn out. On the other hand, it is practically never necessary to replace the elastic element 17 which, during operation, is well protected both against wear due to friction and against thermal variations of the frusto-conical elastic sleeve 12.

Generally speaking, there will be as many sealing devices as there are average cable diameters which can be expected in the production of a stated extruder, and each fluid-tight device serves for a certain range of variation of the cable average diameter. For this reason, the sealing device according to the invention is also easily interchangeable. In fact, it is sufficient to disassemble flanges 11, 11', 11" and to unscrew the nut 22 to detach from the end 10a of the curing tube 10 the entire sealing device 26, the tube 21 and the supporting rod 25 for said tube 21.

At the beginning of the extrusion operation, the pressure in the toroidal elastic element 17 is maintained at a very low value, practically negligible. However, when the cable end on which the sheath 34 has been extruded passes through the opening 19, the lower part of the tube 10 has been filled with a cooling liquid 36, e.g., water, such as by a pump (not shown) and the upper part of the tube has been filled with steam under pressure, the leakage of liquid can be ascertained both directly and through a suitable indicator of the liquid level 27. If the water leakage should be excessive, the pressure reduction valve R should be actuated to admit air into the element 17 through the tube 23, the tube 21 and the stem 18 until the diameter of the opening 19 is such as not to allow further water leakage in volumes greater than the volumes supplied to the lower part of the tube 10.

If the diameter of the sheath 34 increases at the outlet opening 19, the sheath 34 exerts, through the sleeve 12, a thrust on the element or member 17, compressing the air therein contained and permitting, therefore, the continuous emergence of the cable without the possibility of backwards flow of the sheath. If it should be noted that the size of the emerging cable increases to a constant value and that the water leakage decreases below the desired minimum value, the pressure reducer 24 is operated in opposite sense, in order to appropriately reduce the pressure in the member 17 until a sufficient water leakage through the opening 19.

Although a preferred embodiment of the present invention has been described and illustrated, it will be understood by those skilled in the art that various modifications may be made without departing from the principles of the invention.

What is claimed is:

1. In cable curing apparatus having a fluid containing tube through which said cable is passed during the curing thereof, the combination therewith of an adjustable sealing device for the end of said curing tube, said sealing device comprising an elastic sleeve having a frusto-conical interior surface, said cable being receivable within said sleeve and being longitudinally slidable with respect to said surface, the diameter of the larger diameter end of said surface being larger than the maximum cable diameter and the smaller diameter end of said sleeve having an interior surface diameter approximately equal to the nominal cable diameter and being expandible by the cable to the maximum cable diameter without causing significant flow of the cable exterior surface material, a rigid sleeve extending around and engaging the exterior surface of said elastic sleeve but having a portion spaced from said exterior surface at the smaller diameter end of said interior surface, fluid expandible elastic means intermediate said portion and said elastic sleeve and extending around said elastic sleeve for varying the diameter of the interior surface of said elastic sleeve at said smaller diameter end thereof, and means for supplying a fluid under pressure to said elastic means for varying the size thereof.

2. A sealing device as set forth in claim 1, wherein said rigid sleeve has a portion which extends radially inwardly and engages the end of said elastic sleeve having said smaller diameter interior surface to oppose movement of said elastic sleeve axially thereof, said last-mentioned portion having an opening therethrough co-axial with the axis of said interior surface and of a diameter larger than said maximum diameter of said cable.

3. A sealing device as set forth in claim 2, wherein said expandible elastic means comprises an elastic element in the shape of a toroid and is free to separate from said elastic sleeve.

4. A sealing device as set forth in claim 3, wherein said means for supplying fluid under pressure comprises a detachable tube and a fluid pressure reducer.

5. A sealing device as set forth in claim 3, further comprising means for securing said larger diameter end of said elastic sleeve to an end of said curing tube with the axis of said interior surface co-axial with the opening in said end of said tube.

6. A sealing device as set forth in claim 5, wherein said tube comprises a cooling liquid in the portion thereof adjacent said end thereof and a high temperature fluid adjacent said liquid.

* * * * *

UNITED STATES PATENT OFFICE
CERTIFICATE OF CORRECTION

Patent No. 3,825,271      Dated July 23, 1974

Inventor(s) Aldo Bellasio

It is certified that error appears in the above-identified patent and that said Letters Patent are hereby corrected as shown below:

Identifier [75] - "Aldo Bellastio" should read --Aldo Bellasio--

Identifier [73] - "Industrail" should read --Industrie--

Signed and sealed this 29th day of October 1974.

(SEAL)
Attest:

McCOY M. GIBSON JR.           C. MARSHALL DANN
Attesting Officer            Commissioner of Patents